United States Patent
Rao et al.

(10) Patent No.: US 10,985,520 B2
(45) Date of Patent: Apr. 20, 2021

(54) LONG-DISTANCE FIBER OPTIC DISTRIBUTED ACOUSTIC SENSING AMPLIFICATION SYSTEM AND METHOD THEREOF

(71) Applicant: University of Electronic Science and Technology of China, Sichuan (CN)

(72) Inventors: Yunjiang Rao, Sichuan (CN); Kang Li, Sichuan (CN); Bing Han, Sichuan (CN); Yun Fu, Sichuan (CN); Zengling Ran, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 73 days.

(21) Appl. No.: 16/427,347

(22) Filed: May 31, 2019

(65) Prior Publication Data
US 2019/0288475 A1 Sep. 19, 2019

(30) Foreign Application Priority Data

Jan. 31, 2019 (CN) .......................... 201910101194.7

(51) Int. Cl.
*H01S 3/067* (2006.01)
*G01H 9/00* (2006.01)
*G01D 5/353* (2006.01)
*H01S 3/094* (2006.01)

(52) U.S. Cl.
CPC ..... *H01S 3/06754* (2013.01); *G01D 5/35361* (2013.01); *G01H 9/004* (2013.01); *H01S 3/094003* (2013.01)

(58) Field of Classification Search
CPC .......... H01S 3/06754; H01S 3/094003; G01D 5/3536; G01D 5/35377; G01D 5/35358; G01D 5/35325; G01H 9/004
See application file for complete search history.

(56) References Cited

U.S. PATENT DOCUMENTS

| | | | | |
|---|---|---|---|---|
| 2012/0297883 A1* | 11/2012 | Kupershmidt | ......... | G01H 9/004 73/655 |
| 2014/0334253 A1* | 11/2014 | Lumens | ................. | G01V 1/226 367/14 |
| 2015/0000415 A1* | 1/2015 | Kelley | ................ | B61L 15/0054 73/649 |
| 2017/0082484 A1* | 3/2017 | Farhadiroushan | .... | E21B 47/002 |
| 2019/0058524 A1* | 2/2019 | Rao | ..................... | H04B 10/2916 |

FOREIGN PATENT DOCUMENTS

CN 108808431 * 11/2018

* cited by examiner

*Primary Examiner* — Helen C Kwok (57) ABSTRACT

A long-distance FODAS amplification system includes a distributed amplification unit, which includes a LEAF, a pump, and a WDM; wherein the pump light passes through the WDM into the LEAF, so as to realize distributed amplification. A long-distance FODAS amplification method includes steps of: 1) modulating and amplifying a light source to obtain the probe pulse light; 2) guiding the pump light and the probe pulse light into LEAF; 3) combining the probe pulse light with the pump light to perform distributed amplification, so as to generate power-raised Rayleigh backscattered light; and 4) converting and demodulating the Rayleigh backscattered light after being output through the circulator, so as to complete distributed sensing.

11 Claims, 5 Drawing Sheets

Fig. 9 modulating and amplifying a light source by an optical modulator and an optical amplifier, so as to obtain a probe pulse light; injecting the probe pulse light into a circulator guiding pump light generated by a pump and the probe pulse light output by the circulator into a large effective area fiber through a wavelength division multiplexer combining the probe pulse light with the pump light in the large effective area fiber to perform distributed amplification, so as to generate power-raised Rayleigh backscattered light converting and demodulating the Rayleigh backscattered light after being output through the circulator, so as to complete distributed sensing

Fig. 10

LONG-DISTANCE FIBER OPTIC DISTRIBUTED ACOUSTIC SENSING AMPLIFICATION SYSTEM AND METHOD THEREOF

CROSS REFERENCE OF RELATED APPLICATION

The present invention claims priority under 35 U.S.C. 119(a-d) to CN 201910101194.7, filed Jan. 31, 2019.

BACKGROUND OF THE PRESENT INVENTION

Field of Invention

The present invention relates to a technical field of long-distance fiber optic distributed acoustic sensing, and more particularly to a long-distance fiber optic distributed acoustic sensing amplification system and a method thereof.

Description of Related Arts

In modern society, distributed fiber optic sensing (DFOS) technology has been widely used in various fields. DFOS has strong anti-electromagnetic interference capability, high sensitivity and long sensing distance. Among them, fiber optic distributed acoustic sensing (FODAS) system based on phase-sensitive optical time domain reflectometer (Φ-OTDR) has received extensive attention, which has shown great potential in oil and gas exploration, pipeline security and other fields. When the external sound field changes, the phase difference of the probe pulse light in the fiber changes due to the length and reflective indexes vary along the fiber. Thus by demodulating the phase difference of the Rayleigh backscattered signal, the external sound field can be restored.

Conventionally, FODAS generally uses single mode fiber (SMF) as the sensing fiber, and the sensing distance is short. That's because the nonlinear effect threshold of SMF is relatively low. When the peak power of the probe pulse light exceeds the nonlinear effect threshold of SMF, the energy of probe pulse light will transfer to the nonlinear scattering, resulting in low optical signal-to-noise ratio (OSNR). Therefore, the probe pulse light power injected into the sensing fiber must be limited. Although the intensity of the Rayleigh backscattered light can be increased by widening the width of probe pulse light, the spatial resolution is sacrificed since it is determined by the pulse width in the FODAS system.

Large effective area fiber (LEAF), as a new generation of optical communication fiber, can be applied to FODAS system. In such a manner that the nonlinear effect threshold will be effectively increased, and the sensing distance will be further extended. However, influenced by fiber loss and Rayleigh scattering, the power of the probe pulse light is still exponentially attenuated during transmission along the fiber, and the sensing distance is limited. While, if the incident power of the probe pulse light is too high, nonlinear effects will also occur. Therefore, the conventional LEAF fiber optic distributed acoustic sensing (LEAFFODAS) system is difficult to achieve distributed sensing over longer distance.

SUMMARY OF THE PRESENT INVENTION

An object of the present invention is to provide a long-distance FODAS amplification system and a method thereof, for overcoming the problem that the existing FODAS system is difficult to achieve distributed sensing over longer distance.

Accordingly, in order to accomplish the above object, the present invention provides:

a long-distance FODAS amplification system, comprising: a light source, an optical modulator, an optical amplifier, a circulator and a sensing fiber, which are sequentially connected; wherein a signal detecting unit and a signal demodulating unit are also sequentially connected to the circulator, and the optical modulator is further connected to a multiple frequency pulse generator; wherein the long-distance FODAS amplification system further comprises: a distributed amplification unit, which provides gain for probe pulse light to increase intensity of Rayleigh backscattering and realizes long-distance sensing; wherein the distributed amplification unit comprises a LEAF, a pump, and a wavelength division multiplexer (WDM); wherein pump light transmits through the WDM to the LEAF, so as to achieve distributed amplification.

Preferably, the pump comprises a pump A; the WDM comprises a WDM A; the pump A, the WDM A, and the LEAF are sequentially connected for co-pumped distributed amplification.

Preferably, the pump comprises a pump A and a pump B; the WDM comprises a WDM A and a WDM B; the pump A, the WDM A, the LEAF, the WDM B and the pump B are sequentially connected for bi-directional distributed amplification.

Preferably, the long-distance FODAS amplification system further comprises: a remote pump amplifying unit, which comprises an active fiber disposed in the middle of the LEAF; wherein the pump is injected into the active fiber to provide more gain for the probe pulse light, thereby prolonging sensing distance.

Preferably, the pump comprises a pump A; the WDM comprises a WDM A; the pump A, the WDM A, and the LEAF are sequentially connected; the active fiber is disposed in the middle of the LEAF for co-pumped distributed amplification and remote optical pump amplification (ROPA).

Preferably, the pump comprises a pump A and a pump B; the WDM comprises a WDM A and a WDM B; the pump A, the WDM A, the LEAF, the WDM B and the pump B are sequentially connected; the active fiber is disposed in the middle of the LEAF for bi-directional distributed amplification and ROPA.

The present invention also provides a long-distance FODAS amplification method, comprising steps of:

1) modulating and amplifying probe light by an optical modulator and an optical amplifier, so as to obtain a probe pulse light injecting into a circulator;

2) transmitting the pump light and the probe pulse light output by the circulator into a LEAF through a WDM to perform distributed amplification, so as to increase the intensity of Rayleigh backscattered light; and 3) converting and demodulating the Rayleigh backscattered light after the circulator, so as to achieve distributed sensing.

Preferably, distributed amplification is co-pumped; wherein the pump comprises a pump A, and the WDM comprises a WDM A, then co-pumped distributed amplification comprises steps of:

a1) transmitting pump light output by the pump A and the probe pulse light into the LEAF through the WDM A, and determining whether the power of the pump light reaches the nonlinear effect threshold, wherein if so, pump light energy is transferred to the probe pulse light and a step b1) is executed; if not, amplifying is impossible; and b1) after the pump light energy is completely transferred, the probe pulse light transmits to the end of the fiber with attenuation, so as to obtain power-raised Rayleigh backscattered light and complete co-pumped distributed amplification.

Preferably, distributed amplification is bi-directional; wherein the pump comprises a pump A and a pump B, and the WDM comprises a WDM A and a WDM B, then bi-directional distributed amplification comprises steps of:

a2) using output of the pump A as a forward pump; guiding the forward pump and the probe pulse light into the LEAF through the WDM A, and determining whether the power of the forward pump reaches nonlinear effect threshold, wherein if so, forward pump energy is transferred to the probe pulse light and a step b2) is executed; if not, amplifying is impossible;

b2) after the forward pump energy is completely transferred, the probe pulse light power is increased and continues to transmit; completing forward pump distributed amplification before executing a step c2); and c2) transmitting output of the pump B into the WDM B to form a backward pump; when the probe pulse light is transmitted to the end of LEAF, determining whether the power of the backward pump reaches nonlinear effect threshold, wherein if so, backward pump energy is transferred to the probe pulse light, so as to obtain power-raised Rayleigh backscattered light and complete backward pump distributed amplification: if not, amplifying is impossible.

Preferably, distributed amplification is a combination of co-pumped distributed amplification and ROPA; wherein the pump comprises a pump A, the WDM comprises a WDM A, and an active fiber is disposed in the middle of the LEAF for ROPA, then the combination of co-pumped distributed amplification and ROPA comprises steps of:

a1') guiding pump light output by the pump A and the probe pulse light into the LEAF through the WDM A, and determining whether the power of the pump light reaches nonlinear effect threshold, wherein if so, pump light energy is transferred to the probe pulse light and a step b1') is executed; if not, amplifying is impossible; and b1') before the pump light is completely consumed, injecting residual pump light into the active fiber, so as to obtain power-raised Rayleigh backscattered light and complete the combination of co-pumped distributed amplification and ROPA.

Preferably, distributed amplification is a combination of bi-directional distributed amplification and ROPA; wherein the pump comprises a pump A and a pump B, the WDM comprises a WDM A and a WDM B, and an active fiber is disposed in the middle of the LEAF for ROPA, then the combination of bi-directional distributed amplification and ROPA comprises steps of:

a2') using output of the pump A as forward pump; guiding the forward pump and the probe pulse light into the LEAF through the WDM A, and determining whether the power of the forward pump reaches nonlinear effect threshold, wherein if so, forward pump energy is transferred to the probe pulse light and a step b2') is executed; if not, amplifying is impossible;

b2') after the forward pump energy is transferred, increasing power of the probe pulse light and keeping transmitting; completing forward pump distributed amplification before executing a step c2');

c2') before forward pump light is completely consumed, injecting residual forward pump light into the active fiber; after the power of the probe pulse light is increased, the probe pulse light transmits with attenuation, and executing a step d2'); and d2') guiding output of the pump B into the WDM B to form backward pump; when the probe pulse light is transmitted to the end, determining whether the power of the backward pump reaches nonlinear effect threshold, wherein if so, backward pump energy is transferred to the probe pulse light, so as to obtain power-raised Rayleigh backscattered light and complete the combination of bi-directional distributed amplification and ROPA; if not, amplifying is impossible.

Therefore, due to the above technical solutions, beneficial effects of the present invention are as follows.

1. The present invention performs distributed amplification of the LEAFFODAS system, and uses distributed amplification or combination of distributed amplification and ROPA to provide sufficient gain for the probe pulse light transmitted in the LEAF, so as to overcome the fiber loss, change the power distribution of the probe pulse light along the sensing fiber, and improve the probe pulse power at the low-power position, thereby greatly extending the sensing distance of the FODAS system.

2. The present invention uses LEAF as the sensing fiber of the system, which reduces the transmission loss of the probe pulse light in the sensing fiber, increases the nonlinear effect threshold in the sensing fiber, and increases the input power of the probe pulse light. As a result, the power of the probe pulse light entering the sensing fiber can be increased without sacrificing spatial resolution, thereby increasing the intensity of the Rayleigh backscattered light with higher OSNR and effectively extending the sensing distance of the FODAS system.

3. The present invention performs amplification for probe pulse light through the co-pumped or the bi-directional distributed amplification with the help of the nonlinear effects, so as to provide sufficient gain to overcome the fiber loss. Meanwhile, the pump light is injected into the active fiber used for ROPA and excites doped particles to provide more gain for amplifying the probe pulse light, which further increases the power of the probe pulse light at the low-power position, thereby prolonging the sensing distance.

4. Transmission and amplifying gain are integrated in the fiber, wherein the transmission fiber is simultaneously used as gain medium to realize longer-distance repeaterless amplification.

BRIEF DESCRIPTION OF THE DRAWINGS

In order to more clearly illustrate the technical solutions of the embodiments of the present invention, the drawings used in the embodiments will be briefly described below.

It should be understood that the following drawings show only certain embodiments of the present invention, and therefore should be seen as a limitation on the scope. Those skilled in the art can obtain other related drawings according to these drawings without any creative work.

Element reference: 1—light source; 2—optical modulator; 3—multiple frequency pulse generator; 4—optical amplifier; 5—circulator; 6-1—Raman pump A; 6-2—Raman pump B; 7-1—WDM A; 7-2—WDM B; 8—LEAF; 9—signal detection unit; 10—signal demodulation unit; 11—erbium-doped fiber (EDF).

DETAILED DESCRIPTION OF THE PREFERRED EMBODIMENT

The present invention will be further described below with reference to the accompanying drawings and embodiments. It is understood that the specific embodiments described herein are merely illustrative of the invention and are not intended to be limiting. That is to say, the described embodiments are only a part of the embodiments of the present invention, and not all of them. The components of the embodiments of the invention, which are generally described and illustrated in the figures herein, may be arranged and designed in various different configurations.

Therefore, the following detailed description of the embodiments of the present invention is not intended to be limiting, but merely represents selected embodiments of the present invention. All other embodiments obtained by those skilled in the art based on the embodiments of the present invention without creative efforts are within the scope of the present invention.

It should be noted that the terms "first" and "second" and the like are used to distinguish one entity or operation from another entity or operation, and do not necessarily require or imply these entities or operations have any actual relationship or order between them. Furthermore, the term "comprises" or "comprising" or any other variations thereof is intended to encompass a non-exclusive inclusion, such that a process, method, article, or device that includes not only those claimed elements, but also other elements that are inherent to such a process, method, article, or device. An element that is defined by the phrase "comprising a . . . " does not exclude the presence of additional equivalent elements in the process, method, item, or device that comprises the element.

Figure 2:
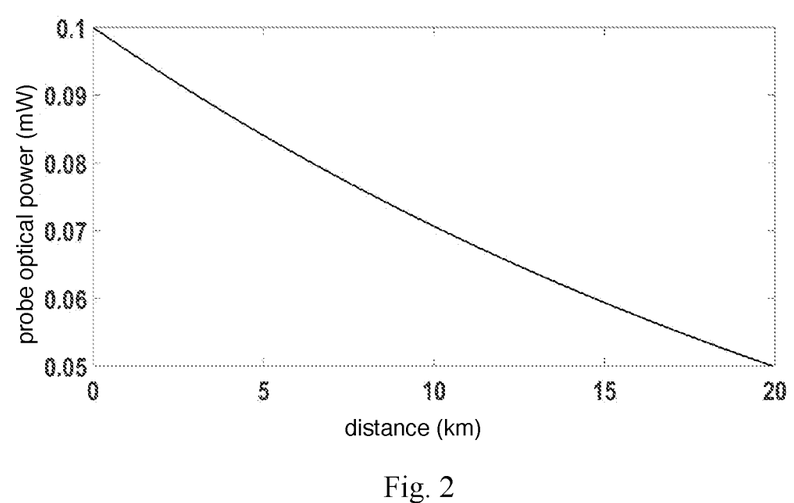
FIG. 2 is a transmission power distribution diagram of probe pulse light in LEAF.

Fiber loss of the probe pulse light:

First, if $P_0$ is the incident power, then the power at the end of the fiber is as shown in equation (1).

$$P_T = P_0 e^{-\alpha L} \quad (1)$$

wherein $\alpha$ is fiber attenuation coefficient, which is a measurement value of fiber loss; L is fiber length. It can be seen from the above equation that when light transmits in the fiber, the power distribution of the probe pulse light is exponentially attenuated due to the influence of the fiber loss. It is assumed that incident power of the continues light is 0.1 mW and the attenuation coefficient is 0.15 dB/km, then the power distribution along the optical fiber is shown in FIG. 2, wherein after transmitting to 20 km, the power of the probe pulse light is attenuated to half of the incident power due to the fiber loss.

Principle of extending sensing distance by distributed Raman amplification:

When a beam of weak probe light with a frequency $f_s$ and a beam of strong pump light with a frequency of $f_p$ transmit simultaneously along the same or the opposite direction in the fiber, if the frequency difference between the two beams is within the Raman gain range, the power of the strong pump light will transfer to and amplify the weak probe light. Such process is called stimulated Raman effect, which achieves distributed Raman amplification. Transmission and gain are integrated in the fiber, wherein the transmission optical fiber is simultaneously used as gain medium to realize longer-distance repeaterless amplification.

Raman gain in the optical fiber is as shown in equation (2):

$$G(\text{dB}) = 1g \frac{g_r \cdot L_{\mathit{eff}} \cdot P_0}{A_{\mathit{eff}}} \quad (2)$$

where $g_r$ is Raman gain coefficient of the fiber, $P_0$ is incident pump power, $L_{\mathit{eff}}$ is the effective fiber length of Raman scattering, and $A_{\mathit{eff}}$ is the fiber effective area.

It can be seen from the above equation that the Raman gain is related to the fiber material, the attenuation of the Raman pump, the incident pump power, and the fiber effective area. The Raman gain coefficient in SMF is about 0.4 $W^{-1}km^{-1}$, and in LEAF is about 0.31 $W^{-1}km^{-1}$. This is because the effective area of LEAF is larger than that of SMF, so higher pump power is required to achieve the same Raman gain as SMF. However, since the core of LEAF is mostly made of pure silica, its attenuation coefficient generally equals to 0.16 dB/km, while the attenuation coefficient of SMF is generally about 0.2 dB/km. Furthermore, the attenuation coefficient of 1455 nm Raman pump in SMF is 0.26 dB/km, which is higher than that of LEAF (0.22 dB/km). In summary, Raman distributed amplification effect in LEAF should be better than that in SMF. With the distributed amplification, the probe pulse light can get sufficient gain to compensate the attenuation during transmission, thereby changing power distribution along the sensing optical fiber and prolonging the sensing distance.

Principle of extending sensing distance by ROPA:

ROPA technique sets the active fiber at a suitable position in fiber link, wherein high-power pump transmits from transmitting end or receiving end of the system through dedicated pumping fiber or transmitting fiber itself. After transmission, the light enters the active fiber and excites the doped particles, so that the probe pulse light is amplified inside the active fiber.

Combining ROPA with distributed Raman amplification can provide more gain for the probe pulse light, which further increases the sensing distance. Therefore, the sensing distance of the LEAFFODAS system can be effectively extended by distributed amplification or combination amplification.

Figure 1:
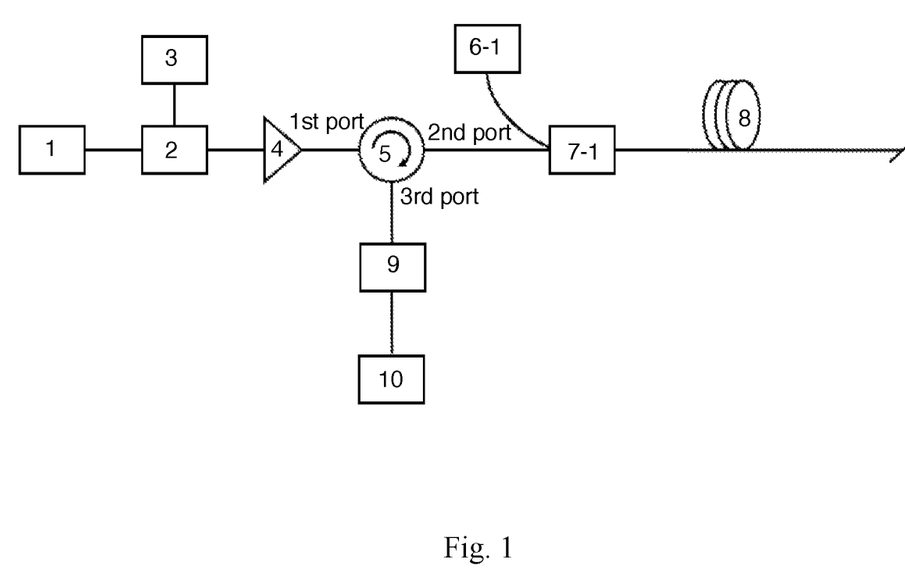
FIG. 1 is a schematic diagram of the distance extension method of a LEAFFODAS system based on co-pumped distributed Raman amplification.

LEAFFODAS system description:

Based on the above, the LEAFFODAS system will be described with reference to FIG. 1. As shown in FIG. 1, the system uses a high-coherence narrow linewidth laser as light source 1, and the light output from light source 1 is modulated into pulses by optical modulator 2. Then the pulse is amplified by an optical amplifier 4 to be probe pulse light and input into the first port of a circulator 5. The probe pulse light enters LEAF 8 through the second port of the circulator 5. Rayleigh backscattered light in LEAF 8 transmits to a signal detecting unit 9 through the third port of the circulator 5, wherein optical signal is converted into electrical signal, and data acquisition and demodulation are performed in a signal demodulating unit 10. Specific structural connections are: the light source 1, the optical modulator 2, the optical amplifier 4, the circulator 5 and the LEAF 8 are sequentially connected; the optical modulator 2 and a multiple frequency pulse generator 3 are connected; the circulator 5, the signal detecting unit 9 and the signal demodulating unit 10 are also connected in sequence.

Role of each system component:

The light source 1 outputs continuous light, which adopts a 1550 nm narrow linewidth single-frequency laser, wherein linewidth is <1 kHz and the stable laser power can reach 150 mW or more. Other commercial narrow linewidth lasers can also be used, but the linewidth must be <10 kHz.

The light modulator 2 modulates the continuous light output from the light source 1 into probe pulse light, which adopts an acoustic optic modulator or an electronic optic modulator, and the pulse width of the modulated pulse light is adjustable.

The multiple frequency pulse generator 3 drives the optical modulator 2 to generate the probe pulse light, which adopts a high sampling rate signal generator, or an acoustic optic or electric optic modulator driver.

The optical amplifier 4 increases the peak power of the probe pulse light, which adopts an erbium doped fiber amplifier (EDFA) or other 1550 nm optical amplifier.

The circulator 5 allows the probe pulse light to enter the second port through the first port of the circulator 5, and allows the Rayleigh backscattered light of the probe pulse light to enter the third port from the second port, thereby preventing the backscattered light from returning to the light source 1 and other elements. The circulator 5 may be replaced by an isolator and a coupler with same functions.

The LEAF 8 is used as the sensing fiber of the FODAS system, whose attenuation coefficient is <0.18 dB/km, wherein the effective area is increased as much as possible, and $A_{eff}$>100 μm$^2$.

The signal detecting unit 9 converts Rayleigh backscattered optical signal carrying sensing information into electrical signal, which adopt a photodetector with bandwidth of 400 MHz or other low-noise photodetectors.

The signal demodulating unit 10 performs data processing and demodulation on the electrical signal output by the signal detecting unit 9, and restores information such as position and amplitude of external sound field, thereby realizing distributed real-time monitoring.

Based on the LEAFFODAS system, a distributed amplification unit is added for optical amplification, which comprises a pump and a WDM; or a pump, a WDM and active fiber.

The pump provides the pump light for distributed amplification, which adopts a commercial light source, or a light source with other structures, wherein pump power is adjustable.

The WDM is used to couple the pump light and the probe pulse light into the sensing fiber, which adopts a commercial WDM or other devices that achieves the same function.

The active fiber provides gain for the probe pulse light, which adopts an erbium-doped optical fiber, or other fiber doped with active particles.

The present invention will be further described in conjunction with the accompanying drawings and embodiments. In the following simulations, it is assumed that the average incident power of the probe pulse light is 0.1 mW, the effective area and the Raman gain coefficient of LEAF is 130 μm$^2$ and 0.313 W$^{-1}$km$^{-1}$, respectively, the attenuation coefficient of the 1550 nm probe pulse light and the 1455 nm Raman pump light in LEAF is 0.151 dB/km and 0.22 dB/km, respectively; while the Raman gain coefficient of SMF is 0.4 W$^{-1}$km$^{-1}$, the attenuation coefficient of the 1550 nm probe pulse light and the 1455 nm pump light in SMF is 0.19 dB/km and 0.26 dB/km, respectively.

The features and performance of the present invention are further described below in conjunction with the embodiments.

Embodiment 1

Figure 3:
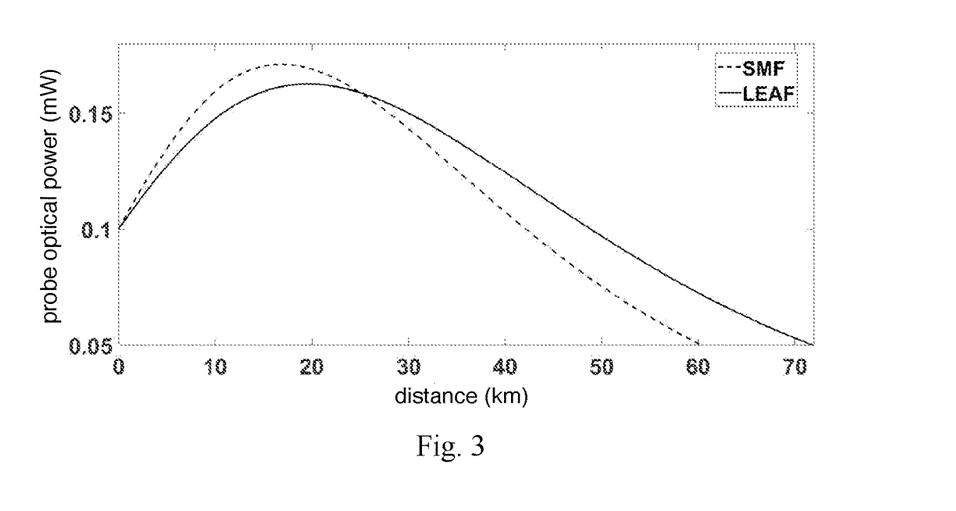
FIG. 3 is a comparative simulation diagram of the probe pulse power distribution in LEAF and SMF based on co-pumped distributed Raman amplification.

As shown in FIG. 1, distributed amplification based on a LEAFFODAS system adopts distributed Raman amplification, wherein a pump adopts a Raman pump A 6-1, and a WDM adopts a WDM A 7-1. According to the embodiment 1, co-pumped distributed Raman amplification is used. The probe pulse light enters the WDM A 7-1 through the second port of a circulator 5, while the pump light of the Raman pump A 6-1 enters the WDM A 7-1. The pump light and the probe pulse light enter LEAF 8 through the WDM A 7-1 for determining whether the power of pump light reaches non-linear effect threshold, wherein if so, the pump light energy transfers to the probe pulse light, and after the pump light energy is completely transferred to the probe pulse light, the probe pulse light transmits to the end of the fiber with attenuation, so as to obtain power-raised Rayleigh backscattered light and complete co-pumped distributed amplification; if not, amplifying is impossible. Referring to FIG. 3, forward Raman pump power is assumed to be 300 mW. It can be seen that due to the Raman gain coefficient is relatively large in SMF, the peak power of the probe pulse light along SMF is higher than that along LEAF. However, sensing distance of the co-pumped distributed Raman-amplified LEAFFODAS system can be increased to 72 km compared to that of 60 km for the FODAS system with SMF.

Embodiment 2

Figure 4:
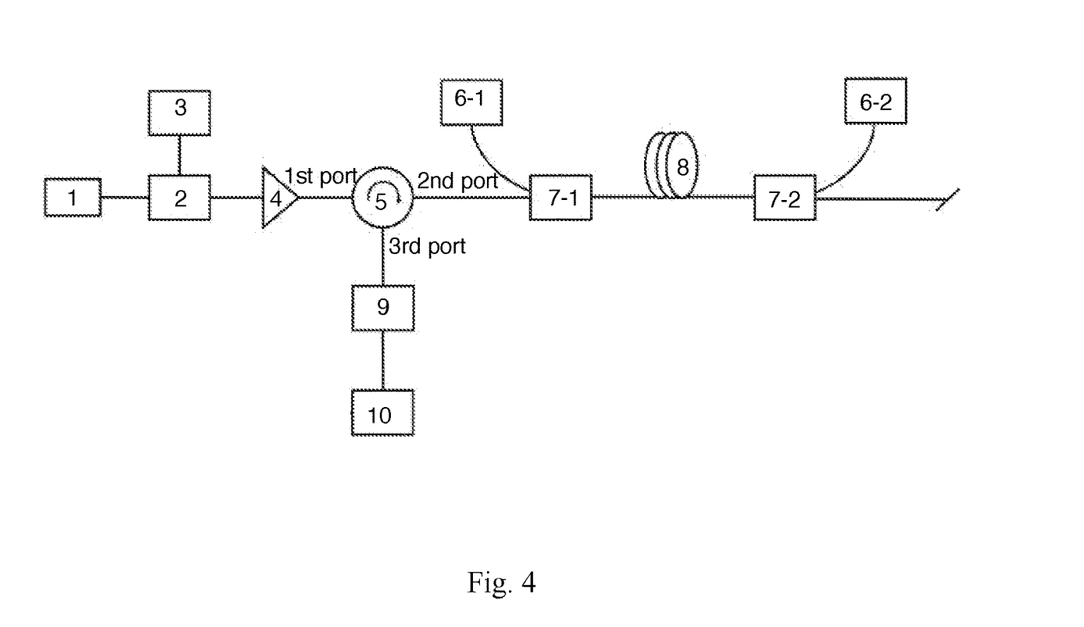
FIG. 4 is a schematic diagram of the distance extension method of a LEAFFODAS system based on bi-directional distributed Raman amplification.
Figure 5:
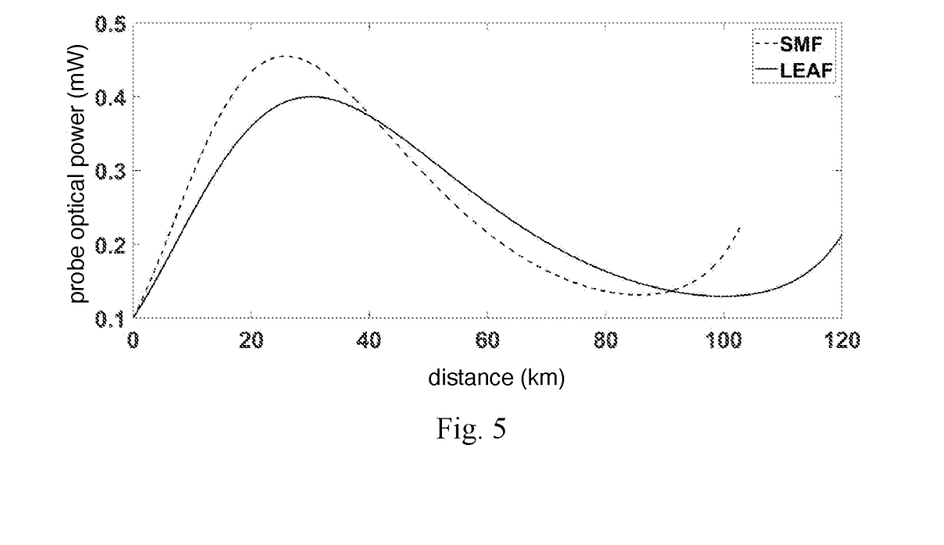
FIG. 5 is a comparative simulation diagram of the probe pulse power distribution in LEAF and SMF based on bi-directional distributed Raman amplification.

As shown in FIG. 4, distributed amplification based on a LEAFFODAS system adopts distributed Raman amplification, wherein a pump adopts a Raman pump A 6-1 and a Raman pump B 6-2, and a WDM adopts a WDM A 7-1 and a WDM B 7-2. According to the embodiment 2, bi-directional distributed Raman amplification is used. Power distribution of the probe pulse light along the fiber is shown by a solid line in FIG. 5. Bi-directional distributed amplification comprises steps of: using pump light of the Raman pump A 6-1 as a forward pump; guiding the forward pump and the probe pulse light into the LEAF 8 through the WDM A 7-1, and determining whether the power of forward pump reaches nonlinear effect threshold. If the pump power is enough, then the energy will be transferred to the probe pulse light. After getting gain from forward pump, the probe pulse light is power-increased and keeps transmitting, thus completing forward pump distributed amplification. The pump light of the pump B 6-2, as backward pump of the probe pulse light, transfers through the WDM B 7-2 to the LEAF 8. When the probe pulse light is transmitted to the end, determining whether the power of the backward pump reaches the nonlinear effect threshold, wherein if so, backward pump energy transfers to the probe pulse light, so as to obtain power-raised Rayleigh backscattered light and complete backward pump distributed amplification. Referring to FIG. 5, forward Raman pump power is 500 mW and backward Raman pump power is 300 mW. As can be seen from FIG. 4 and FIG. 5, the forward Raman pump A 6-1 enters the LEAF 8 through the WDM A 7-1, wherein at the 30 km of the LEAF 8, the probe pulse optical power reaches the maximum value, then the probe pulse light transmits with attenuation, and the backward Raman pump B 6-2 enters the LEAF 8 through the WDM B 7-2, so as to be amplified at 120 km of the fiber. It can be seen from FIG. 5 that when the lowest power positions along the fiber of two systems is identical, the sensing distance of the FODAS system with SMF is only 103 km, while that of the LEAF-FODAS system can be increased to 120 km.

Embodiment 3

Figure 6:
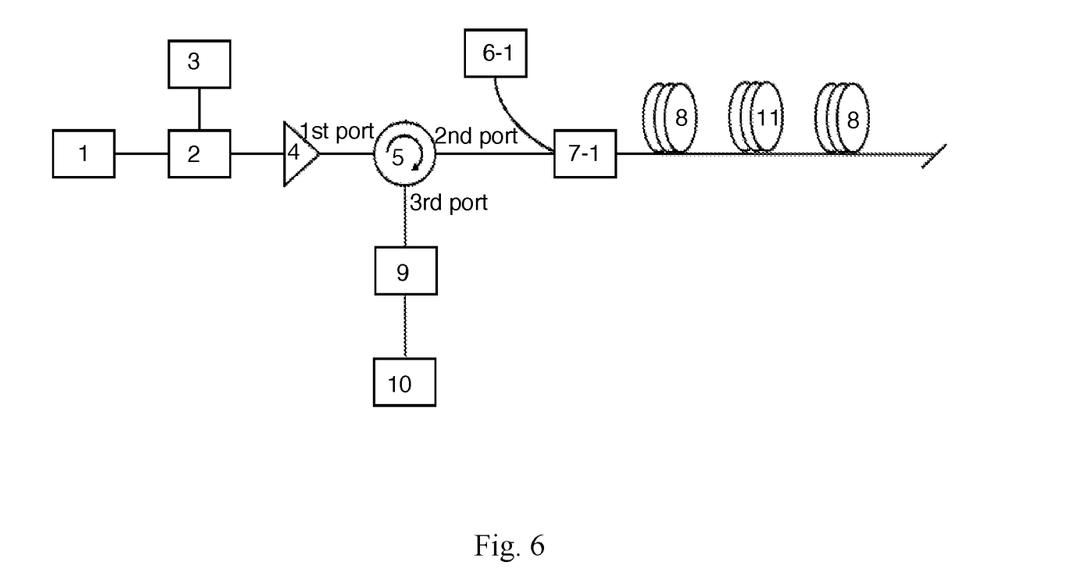
FIG. 6 is a schematic diagram of the distance extension method of a LEAFFODAS system based on the combination of co-pumped distributed Raman amplification and ROPA.
Figure 7:
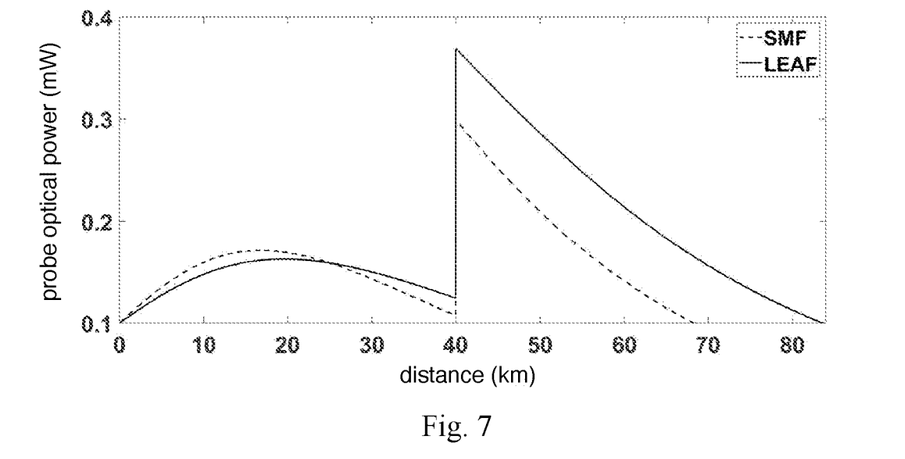
FIG. 7 is a comparative simulation diagram of the probe pulse power distribution in LEAF and SMF based on the combination of co-pumped distributed Raman amplification and ROPA.
Figure 8:
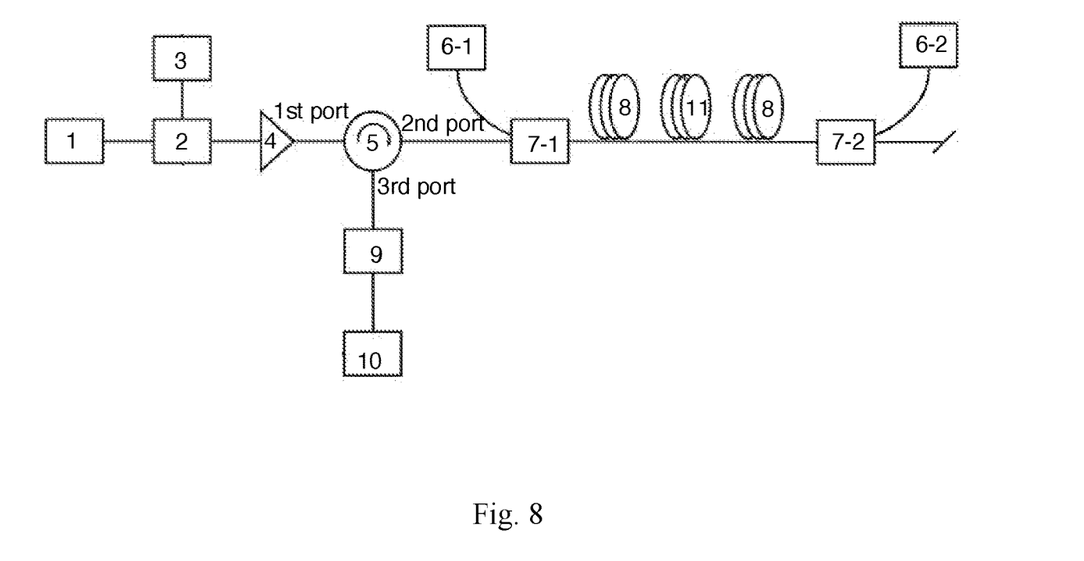
FIG. 8 is a schematic diagram of the distance extension method of a LEAFFODAS system based on the combination of bi-directional distributed Raman amplification and ROPA.

Distributed amplification based on a LEAFFODAS system adopts distributed Raman amplification, wherein an active fiber used for ROPA adopts EDF 11, a pump adopts a Raman pump A 6-1, and a WDM adopts a WDM A 7-1. According to the embodiment 3, the combination of co-pumped distributed amplification and ROPA is used, a structural view of a corresponding LEAFFODAS system is shown in FIG. 6. After the pump light of the Raman pump A 6-1 and the probe pulse light enter the LEAF 8 through the WDM A 7-1, the pump light energy transfers to the probe pulse light due to stimulated Raman scattering, providing gain to the probe pulse light and increasing power thereof. After the pump light is consumed, the gain of the probe pulse light is reduced, then the power is reduced. Before the pump light is completely consumed, residual pump light injects into the active fiber, namely the EDF 11, so as to excites active ions in the EDF 11, thereby providing additional gain for the probe pulse light. The probe pulse light transmits to the end of the fiber after power increasing and then attenuation. Referring to FIG. 7, it is assumed that Raman pump power is 300 mW, and the EDF 11 placed at 40 km of the LEAF 8 is 2 m. As shown by solid lines in FIG. 6 and FIG. 7, after the Raman pump A 6-1 enters the LEAF 8 through the WDM A 7-1, the gain is provided to the probe pulse light at the front end of the fiber, which reaches a maximum value at 20 km. Then the probe pulse light suffers attenuation, and residual Raman pump light injects into the EDF 11 to excite erbium ions, so as to amplify the probe pulse light. The power of the probe pulse light is significantly increased and then subjected to attenuation before transmitting to the end of the fiber, wherein the sensing distance can reach 84 km. Since the loss of the probe pulse light and the pump light are relatively larger in SMF, the power of the probe pulse light and the Raman pump light power transmitted to the EDF 11 is low, leading to relatively weak gain for the probe pulse light provided by the EDF 11. Therefore, the sensing distance of FODAS system with SMF under the same structure is only 68 km.

Embodiment 4

Figure 9:
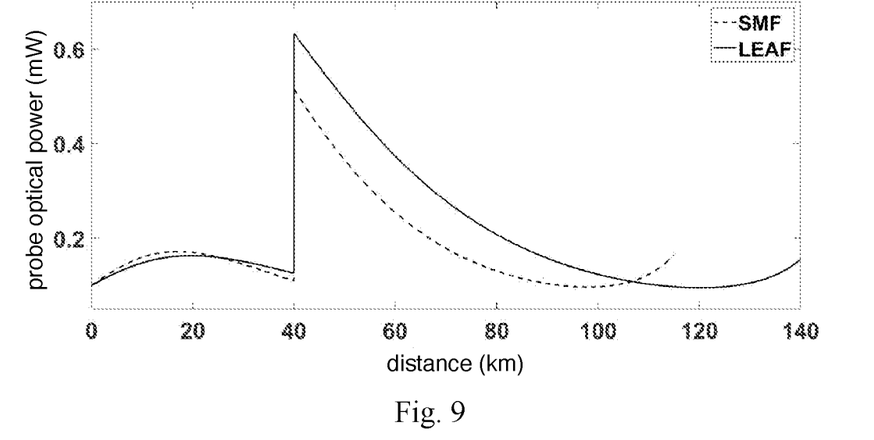
FIG. 9 is a comparative simulation diagram of the probe pulse power distribution in LEAF and SMF based on the combination of bi-directional distributed Raman amplification and ROPA.
Figure 10:
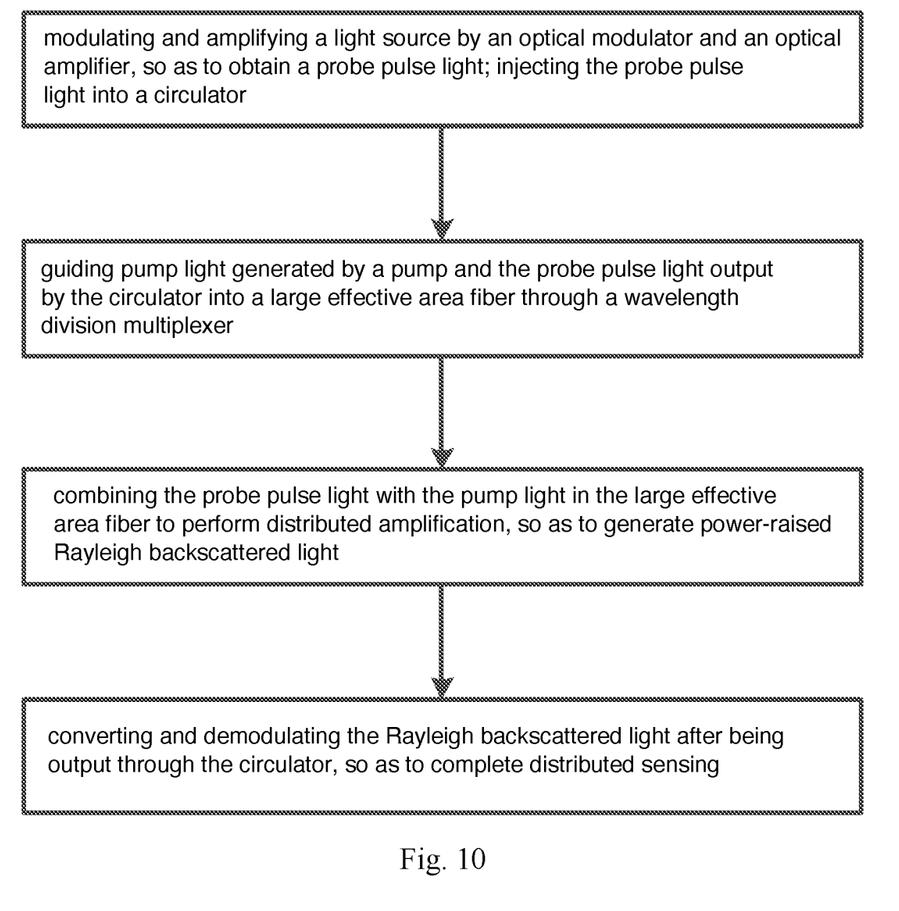
FIG. 10 is a flow chart of a method according to the present invention.

The embodiment 4 uses bi-directional distributed amplification, and adopts a combination of bi-directional distributed amplification and ROPA, wherein a pump adopts a Raman pump A 6-1 and a Raman pump B 6-2, and a WDM adopts a WDM A 7-1 and a WDM B 7-2. A structural view of a corresponding LEAFFODAS system is shown in FIG. 7, wherein the power distribution of the probe pulse light along the LEAF 8 is shown by solid line in FIG. 9. The combination of bi-directional distributed amplification and ROPA comprises steps of: using pump light of the Raman pump A 6-1 as forward pump; guiding the forward pump and the probe pulse light into the LEAF 8 through the WDM A 7-1, and determining whether the power of the forward pump reaches nonlinear effect threshold, wherein if so, forward pump energy transfers to the probe pulse light; before forward pump is completely consumed, injecting residual forward pump into the EDF 11; after the power of the probe pulse light is increased, transmitting the probe pulse light with attenuation; and guiding the pump light of the Raman pump B 6-2 into the WDM B 7-2 to form backward pump of the probe pulse light; when the probe pulse light is transmitted to the end, determining whether the power of backward pump reaches the nonlinear effect threshold, wherein if so, backward pump energy is transferred to the probe pulse light, so as to obtain power-raised Rayleigh backscattered light and complete the combination of bi-directional distributed amplification and ROPA; if not, amplifying is impossible. Referring to FIG. 9, it is assumed that forward Raman pump power is 300 mW and backward Raman pump power is 300 mW. The 3 m EDF 11 is placed at 40 km of the LEAF 8. As can be seen from FIG. 9, on the basis of the embodiment 3, after the backward Raman pump B 6-2 enters the LEAF 8 through the WDM B 7-2, it further amplifies the probe pulse light which is already amplified by the EDF 11 at the end of the fiber, thereby achieving a sensing distance of 140 km. Similarly, when power at lowest power positions along the fiber is identical, and bi-directional distributed Raman amplification technique is adopted, under the same structure, a sensing distance of a FODAS system with SMF is 115 km.

In summary, the present invention processes the probe pulse light in the LEAFFODAS system with distributed amplification, which uses distributed Raman amplification or the combination of distributed Raman amplification and ROPA, so as to provide more gain for the pulse light through co-pumped or bi-directional distributed amplification, thereby overcoming the fiber loss. The present invention also adopts the active fiber, wherein the active particles are excited to provide additional gain for the probe pulse light and increase the power of the probe pulse light. Therefore, the present invention effectively extends the system sensing distance, so as to meet the needs of longer range sensing.

One skilled in the art will understand that the embodiment of the present invention as shown in the drawings and described above is exemplary only and not intended to be limiting. Therefore, this invention includes all modifications encompassed within the spirit and scope of the following claims.

What is claimed is:
1. A long-distance FODAS (fiber optic distributed acoustic sensing) amplification system, comprising: a light source

(1), an optical modulator (2), an optical amplifier (4), a circulator (5) and a sensing fiber, which are sequentially connected; wherein a signal detecting unit (9) and a signal demodulating unit (10) are also sequentially connected to the circulator (5), and the optical modulator (2) is further connected to a multiple frequency pulse generator (3); wherein the long-distance FODAS amplification system further comprises: a distributed amplification unit, which provides gain fora probe pulse light to increase an intensity of Rayleigh backscattering and realizes long-distance sensing; wherein the distributed amplification unit comprises a LEAF (large effective area fiber) (8), a pump, and a WDM (wavelength division multiplexer); wherein a pump light transmits through the WDM to the LEAF (8), so as to achieve distributed amplification.

2. The long-distance FODAS amplification system, as recited in claim 1, wherein the pump comprises a pump A; the WDM comprises a WDM A (7-1); the pump A, the WDM A (7-1), and the LEAF (8) are sequentially connected for co-pumped distributed amplification.

3. The long-distance FODAS amplification system, as recited in claim 1, wherein the pump comprises a pump A and a pump B; the WDM comprises a WDM A (7-1) and a WDM B (7-2); the pump A, the WDM A (7-1), the LEAF (8), the WDM B (7-2) and the pump B are sequentially connected for bi-directional distributed amplification.

4. The long-distance FODAS amplification system, as recited in claim 1, further comprising: a remote pump amplifying unit, which comprises an active fiber disposed in a middle of the LEAF (8); wherein the pump is injected into the active fiber to provide more gain for the probe pulse light, thereby prolonging sensing distance.

5. The long-distance FODAS amplification system, as recited in claim 4, wherein the pump comprises a pump A; the WDM comprises a WDM A (7-1); the pump A, the WDM A (7-1), and the LEAF (8) are sequentially connected; the active fiber is disposed in the middle of the LEAF (8) for co-pumped distributed amplification and ROPA (remote optical pump amplification).

6. The long-distance FODAS amplification system, as recited in claim 4, wherein the pump comprises a pump A and a pump B; the WDM comprises a WDM A (7-1) and a WDM B (7-2); the pump A, the WDM A (7-1), the LEAF (8), the WDM B (7-2) and the pump B are sequentially connected; the active fiber is disposed in the middle of the LEAF (8) for bi-directional distributed amplification and ROPA (remote optical pump amplification).

7. A long-distance FODAS amplification method, comprising steps of:
 1) modulating and amplifying a probe light by an optical modulator and an optical amplifier, so as to obtain a probe pulse light injecting into a circulator;
 2) transmitting a pump light and the probe pulse light output by the circulator into a LEAF through a WDM to perform a distributed amplification, so as to increase an intensity of Rayleigh backscattered light; and
 3) converting and demodulating the Rayleigh backscattered light after the circulator, so as to achieve distributed sensing.

8. The long-distance FODAS amplification method, as recited in claim 7, wherein the distributed amplification is co-pumped; wherein a pump comprises a pump A, and the WDM comprises a WDM A, then the co-pumped distributed amplification comprises steps of:
 a1) transmitting the pump light output by the pump A and the probe pulse light into the LEAF through the WDM A, and determining whether a power of the pump light reaches nonlinear effect threshold, wherein if so, a pump light energy is transferred to the probe pulse light and a step b1) is executed; if not, amplifying is impossible; and
 b1) after the pump light energy is completely transferred, the probe pulse light transmits to an end of the fiber with attenuation, so as to obtain power-raised Rayleigh backscattered light and complete the co-pumped distributed amplification.

9. The long-distance FODAS amplification method, as recited in claim 7, wherein the distributed amplification is bi-directional; wherein a pump comprises a pump A and a pump B, and the WDM comprises a WDM A and a WDM B, then the bi-directional distributed amplification comprises steps of:
 a2) using output of the pump A as a forward pump; guiding the forward pump and the probe pulse light into the LEAF through the WDM A, and determining whether a power of the forward pump reaches nonlinear effect threshold, wherein if so, a forward pump energy is transferred to the probe pulse light and a step b2) is executed; if not, amplifying is impossible;
 b2) after the forward pump energy is completely transferred, increasing probe pulse light power and continuing to transmit; completing forward pump distributed amplification before executing a step c2); and
 c2) transmitting output of the pump B into the WDM B to form a backward pump; when the probe pulse light is transmitted to an end of the LEAF, determining whether a power of the backward pump reaches nonlinear effect threshold, wherein if so, a backward pump energy is transferred to the probe pulse light, so as to obtain power-raised Rayleigh backscattered light and complete backward pump distributed amplification; if not, amplifying is impossible.

10. The long-distance FODAS amplification method, as recited in claim 7, wherein the distributed amplification is a combination of co-pumped distributed amplification and ROPA; wherein a pump comprises a pump A, the WDM comprises a WDM A, and an active fiber is disposed in a middle of the LEAF for ROPA, then the combination of co-pumped distributed amplification and ROPA comprises steps of:
 a1') guiding a pump light output by the pump A and the probe pulse light into the LEAF through the WDM A, and determining whether a power of the pump light reaches nonlinear effect threshold, wherein if so, a pump light energy is transferred to the probe pulse light and a step b1') is executed; if not, amplifying is impossible; and
 b1') before the pump light is completely consumed, injecting residual pump light into the active fiber, so as to obtain power-raised Rayleigh backscattered light and complete the combination of co-pumped distributed amplification and ROPA.

11. The long-distance FODAS amplification method, as recited in claim 7, wherein the distributed amplification is a combination of bi-directional distributed amplification and ROPA; wherein a pump comprises a pump A and a pump B, the WDM comprises a WDM A and a WDM B, and an active fiber is disposed in a middle of the LEAF for ROPA, then the combination of bi-directional distributed amplification and ROPA comprises steps of:
 a2') using output of the pump A as a forward pump light; guiding the forward pump and the probe pulse light into the LEAF through the WDM A, and determining whether a power of the forward pump light reaches nonlinear effect threshold, wherein if so, a forward pump energy is transferred to the probe pulse light and a step b2') is executed; if not, amplifying is impossible;

b2') after the forward pump energy is transferred, increasing a power of the probe pulse light and keeping transmitting; completing forward pump distributed amplification before executing a step c2');

c2') before the forward pump light is completely consumed, injecting residual forward pump light into the active fiber; after the power of the probe pulse light is increased, transmitting the probe pulse light with attenuation, and executing a step d2'); and d2') guiding output of the pump B into the WDM B to form backward pump; when the probe pulse light is transmitted to an end, determining whether a power of the backward pump reaches nonlinear effect threshold, wherein if so, a backward pump energy is transferred to the probe pulse light, so as to obtain power-raised Rayleigh backscattered light and complete the combination of bi-directional distributed amplification and ROPA; if not, amplifying is impossible.

* * * * *